United States Patent [19]

Maxwell

[11] 3,932,115
[45] Jan. 13, 1976

[54] VENTED HOPPER WITH IMPROVED FEED SYSTEM

[76] Inventor: Bryce Maxwell, 19 McCosh Circle, Princeton, N.J. 08540

[22] Filed: Oct. 31, 1974

[21] Appl. No.: 519,455

[52] U.S. Cl................ 432/5; 264/176 C; 432/151; 432/161
[51] Int. Cl.² .......................................... F27D 5/00
[58] Field of Search.................... 432/5, 151, 161; 264/176 R, 176 C; 425/456, 466

[56] References Cited
UNITED STATES PATENTS

| | | | |
|---|---|---|---|
| 3,062,522 | 11/1962 | McCoy | 432/151 |
| 3,172,648 | 3/1965 | Brichard | 432/5 |
| 3,262,154 | 7/1966 | Valyi | 264/176 C |
| 3,277,528 | 10/1966 | Nikiforov | 264/176 C |
| 3,295,165 | 1/1967 | Wallace | 264/176 C |

*Primary Examiner*—John J. Camby
*Attorney, Agent, or Firm*—Sperry and Zoda

[57] ABSTRACT

An apparatus and method for feeding polymeric material to processing and mixing equipment is disclosed which includes a hopper located radially from the axis of rotation of the processing equipment in the direction of rotation and with walls that are inclined at angles which direct the feed material toward the direction of rotation. In addition, a passage is provided within the apparatus for venting gases. The rate of egress of feed material from the hopper to the processing equipment is controlled in response to the need of the processing equipment.

The disclosed apparatus includes a casing, a hopper inclined in the direction of rotation of the processing equipment, a control means acting as a gate for the introduction of new material and forming a passage in conjunction with the casing to provide a space for the escape and removal of volatile material from the processing equipment.

The control means may be moved about a pivot in such a manner as to encourage the feed material into the processing equipment. Such motion may be controlled by an automatic system that responds to the need of the processing equipment for additional feed material.

14 Claims, 4 Drawing Figures

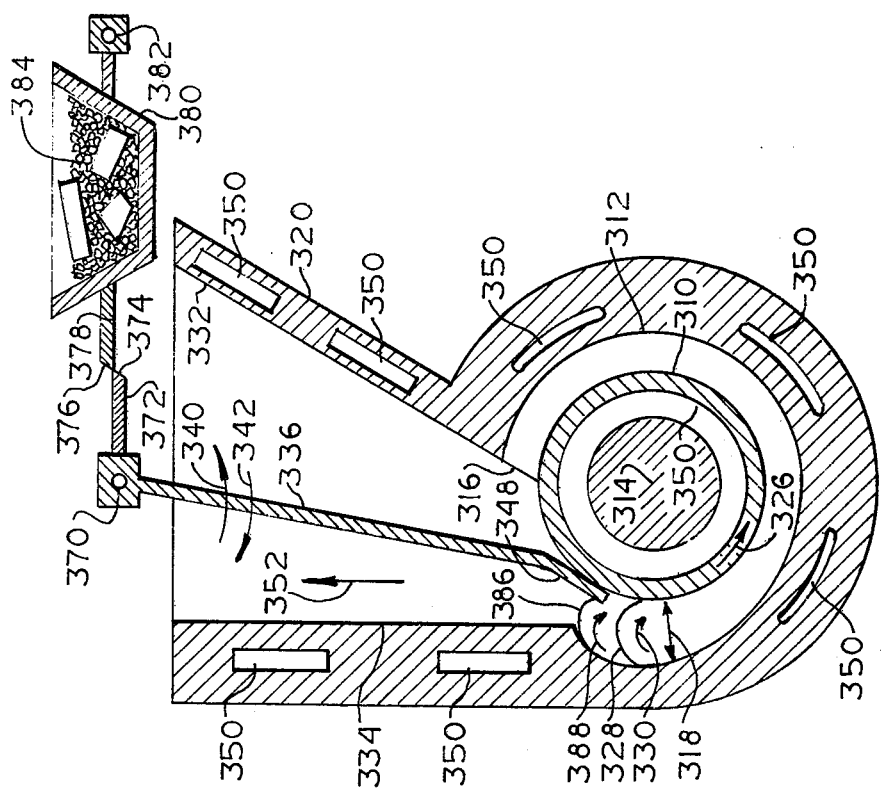
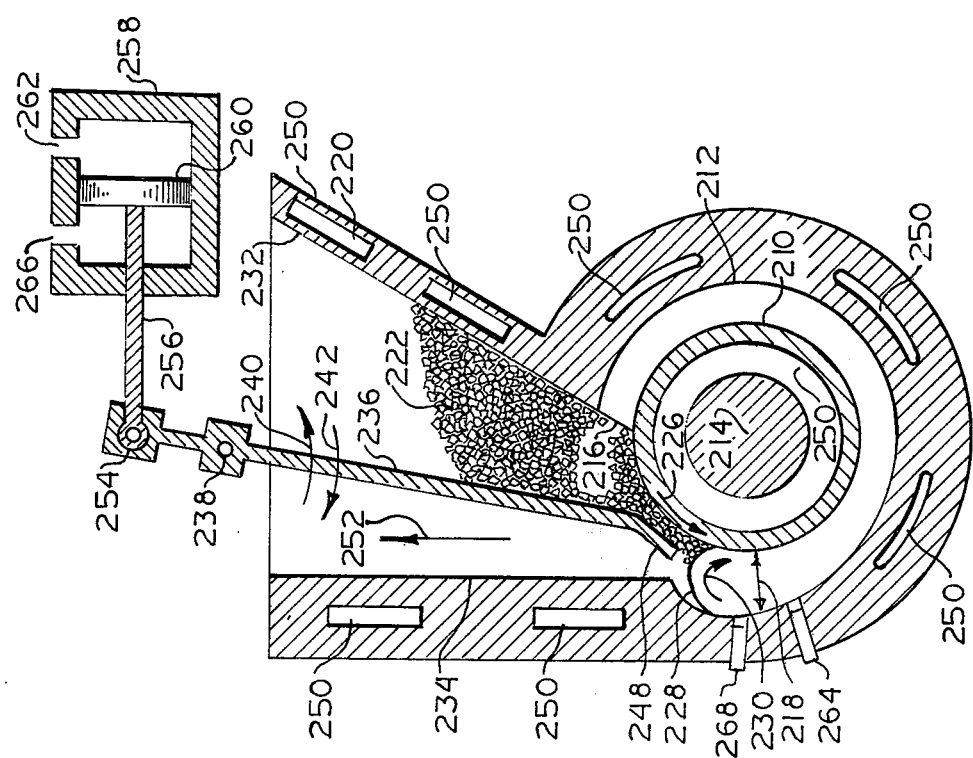
FIG-4
FIG-3

VENTED HOPPER WITH IMPROVED FEED SYSTEM

BACKGROUND OF THE INVENTION

In polymer processing and mixing equipment new feed material falls from a hopper into the processing equipment. The present invention discloses a new type of hopper that obviates some of the undesirable features attending such existing methods and apparatus.

Recently, a new type of mixing extruder has been developed which is commonly known as the elastic melt extruder. This apparatus comprises the subject matter of U.S. Pat. No. 3,046,609, U.S. Pat. No. 3,545,041 and U.S. Pat. No. 3,790,328 all issued to the present inventor on July 31, 1962, Dec. 8, 1970, and Feb. 5, 1974, respectively. The present invention provides a means of introducing new feed material into elastic melt extruders that overcomes some of the undesirable features of the current apparatus.

In addition, the disclosed invention may be used to feed material into the processing apparatus described in applicant's pending application U.S. Ser. No. 358,656, filed May 9, 1973, now U.S. Pat. No. 3,863,905. It should be noted the disclosed invention may be used advantageously to feed material into other types of processing equipment.

Although the above identified processing machines have proven to be highly useful and desirable pieces of equipment for melting, mixing, devolatizing and extending polymer materials, some difficulty has been encountered in the introduction of new feed material in these machines.

Unless some means is provided to facilitate the introduction of new feed material into the processing equipment and to control the rate of input of new feed material, the output rate of the processing equipment varies from time to time in an undesirable manner. This variation in output rate is caused by material bridging in the hopper thereby cutting off the input of new material or by hot, melted material flowing backwards into the hopper when too much feed material has entered the processing equipment. This hot melted material can plug or block the subsequent flow of new feed material from the hopper.

In addition, the current hoppers are designed in a manner that causes any volatile material resulting from the melting of the polymer to flow backwards through the hopper thereby contaminating the new feed material. It is an objective of the present invention to prevent such contamination.

Past efforts in devising apparatus for properly introducing feed materials into polymer processing equipment have resulted in hopper designs that require additional power driven apparatus. Examples of current practice include the use of power rotated augers in the hopper and power activated rams to push material from the hopper. The present invention in some of its manifestations require no external source of power.

It is desirable if an improved apparatus and method were provided for introduction of feed material into processing equipment that would obviate the above discussed problems.

OBJECTS AND SUMMARY OF THE INVENTION

It is an object of the present invention to provide an improved method and apparatus for introducing feed material into processing equipment which is relatively uncomplicated, lends itself to ease of manufacture, and is not difficult to operate or maintain.

It is a further object of the present invention to provide a method and apparatus for introducing feed material into processing equipment in a positive manner without the use of additional sources of power.

It is still a further objective of the present invention to provide a method and apparatus for introducing feed material into processing equipment at a controlled rate.

It is a still further object of the present invention to provide a method and apparatus for introducing feed material into processing equipment without contamination by volatile material generated by the melting of the polymer.

It is a major objective of the present invention to provide a method and apparatus for the introduction of feed material into processing equipment which method and apparatus solve at least some of the problems confronting the industry.

The above cited objectives may in whole or in part be achieved by the provision of a hopper or reservoir located in a position displaced toward the direction of rotation from the axis of rotation of the processing equipment and consisting of a fixed first surface inclined toward the direction of rotation, a second surface also inclined toward the direction of rotation and having a surface section that presses the new feed material against the rotating surface of the processing equipment, and a third surface that provides a passageway with respect to the second surface for the escape of volatile materials. In addition, the above cited objectives may be further achieved by providing a sensing apparatus that determines when the processing equipment is in need of additional feed material and an activating system that moves the said second surface to allow additional feed material to enter the processing equipment, either continuously or in batch form.

BRIEF DESCRIPTION OF THE DRAWINGS

While the invention is particularly pointed out and distinctly claimed in a concluding part of the specification, preferred embodiments are set forth in the following detailed description which may best be understood when read in connection with the accompanying drawings, in which:

FIG. 3 is an axial section view of another embodiment of the present invention; and FIG. 4 is an axial section view of still another embodiment of the present invention.

DETAILED DESCRIPTION OF THE PREFERRED EMBODIMENTS

Figure 1:
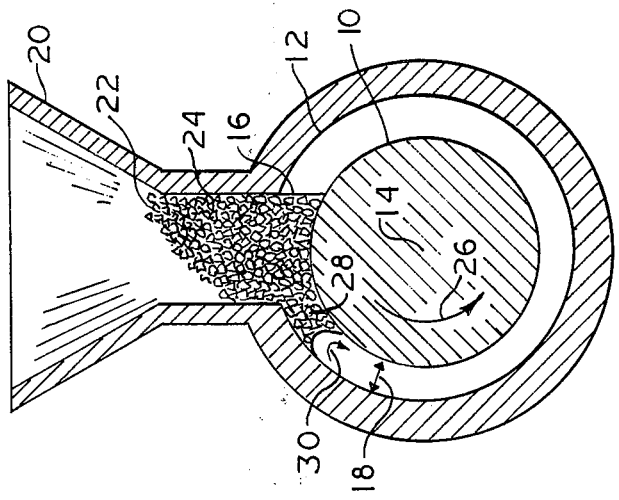
FIG. 1 is an axial section view of an apparatus which represents prior art.

Referring now to the drawings in which like numerals are used to indicate like parts throughout the various views thereof, FIG. 1 is a vertical cross section view of equipment which is typical of the prior art as disclosed in U.S. Pat. No. 3,790,328.

An essentially cylindrical rotor 10 is centrally located within the hollow bore of a stationary case 12 and is rotated about the axis 14. A stationary guide means or "scroll" 16 is located in the annular region 18 as taught by U.S. Pat. No. 3,790,328. A feed hopper 20 is located vertically above the axis of rotation 14 and supplies new feed material 22 to the annular region 18 through a feed port 24 by gravity fall.

The rotation 26 of the rotor 10 causes the new feed material to move into the annular region 18 where it joins with previously melted material to form a rolling bank of polymer melt material 28 which rotates in the direction of the arrow 30 in response to the rotation of the rotor 10. As the processing is continued the new feed material is transported axially forward by the guide means 16 in accordance with the teachings of U.S. Pat. No. 3,790,328.

Typically, in such a prior art apparatus, the flow of polymer material may vary from time to time due to fluctuations in the location of the rolling bank of polymer melt 28 which fluctuations take place in response to operating conditions such as temperature, rate of introduction of new feed material, rotational speed of the rotor 10 and variations in the nature and composition of the feed material. Under some conditions, the melted material may flow backward into the feed port 24 thereby plugging the feed port and preventing new material from entering the processing equipment.

In other cases, the rotation of the rotor with respect to the new feed material does not supply as much feed material as the apparatus is capable of processing. This condition arises when the rotating surface of the rotor 10 does not drag enough new feed material into the rolling bank of melt 28 to supply the needs of the apparatus. Under such conditions, the apparatus is said to be "starved."

Figure 2:
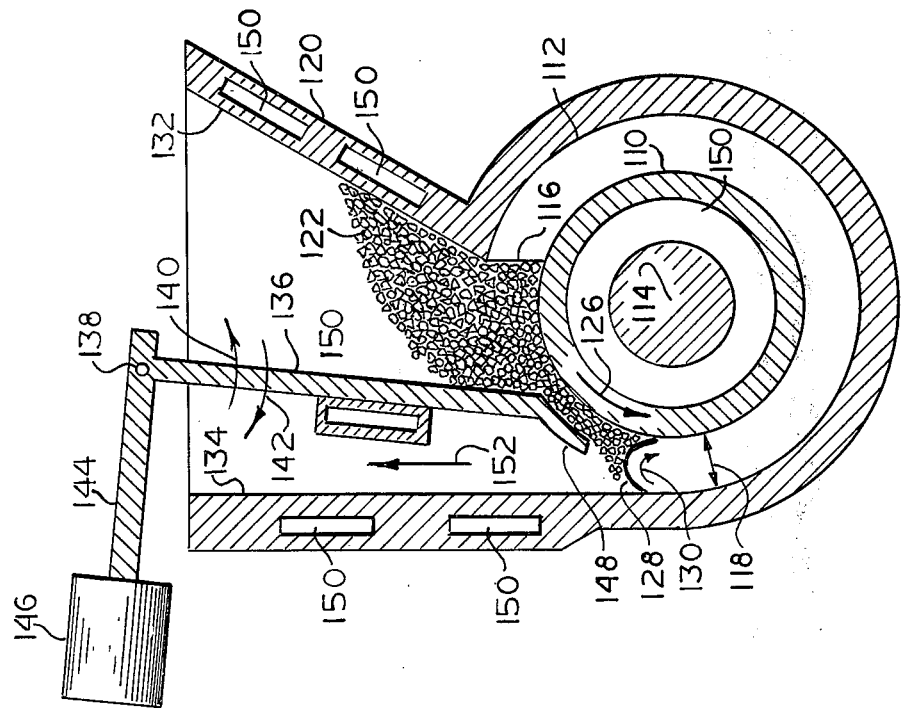
FIG. 2 is an axial section view of the preferred embodiment of the present invention.

Referring now to FIG. 2, it can be seen that a rotor 110 is centrally located in the hollow bore of a stationary case 112 and said rotor can be rotated about axis 114. A guide means or "scroll" 116 is provided to encourage forward axial transport of polymer material. The rotor 110 is separated from the inside surface of the bore of the case 112 by an annular region 118. A hopper 120 to provde new feed material 122 to the region 118 in response to the rotation 126 of the rotor 110 is located above the rotor 110 but horizontally displaced from the vertical position directly above the axis of rotation 114 in the direction of rotation 126. As new feed material falls from the hopper 120 onto the cylindrical surface of the rotor 110 it is dragged into the rolling melt bank of previously melted feed material 128 and is mixed, combined and heated with this material while the bank 128 rotates in the direction 130 in response to the rotation of the rotor 110.

The hopper apparatus comprises a hopper 120, a case 112 and a control means comprising a first surface 132 inclined in the direction of rotation 126 and a third surface 134 located, at its lowest point, tangenial to the inner surface of the bore of the case 112 and extending upward therefrom. A second surface 136 is located between the first surface 132 and the third surface 134. Said second surface may be inclined in the direction of rotation 126 of the rotor 110.

The second surface 136 may be supported on a pivot axis 138 so that it may swing or pivot back and forth in the directions indicated by arrows 140 and 142. Said second surface 136 may be controlled in its rotation around pivot 138 by a lever arm 144 and a weight 146 which combination tends to push the tip 148 of the second surface 136 toward the surface of the rotor 110.

The various surfaces of the processing equipment and hopper may be heated or cooled as may be desirable for efficient operation by channels 150 filled with heat transfer liquids or other conventional means.

In the operation of the apparatus as shown in FIG. 2, the feed material 122 falls onto the surface of the rotor 110 and is dragged toward the rolling bank 128 by the rotation of the rotor 110. The tip 148 of the second surface 136 pushes the new feed material against the surface of the rotor thereby increasing the adhesion of the feed material to the rotor surface and increasing the efficiency of the transport of feed material to the rolling bank 128.

The amount of feed material transported by the rotor may be controlled by adjusting the weight 146 as to mass to accomodate different operating comditions and various feed material forms and species. In addition, as the feed material enters the zone between the tip 148 of the second surface 136 and the surface of the rotor 110, the second surface is caused to oscillate back and forth in the directions 140 and 142 due to the irregular shapes of the feed material particles. This oscillation of the second surface agitates and vibrates the new feed material in the region between the first surface 132 and the second surface 136 thereby reducing any tendency for bridging and suspension of flow of new feed material.

In addition, in the apparatus as depicted in FIG. 2, the passageway between the second surface 136 and the third surface 134 may act as a port or outlet for volatile material resulting from the heating and melting of the material in the rolling bank 128. These volatile materials, some of which are lighter than air, may flow up the passage between surfaces 136 and 134, as indicated by arrow 152, to be exhausted in the atmosphere, or a vacuum chamber or collected for use as a recycled material. By this means, the volatile materials do not come in contact with or contaminate the new feed material 122.

The present invention as shown in FIG. 2 provides a method and apparatus for improving control of the introduction of feed material into processing equipment and an apparatus for agitating or vibrating the feed material in the hopper to prevent hold-up or bridging and a passage for the exit or removal of volatile material resulting from the heating and melting of the feed material. All of these functions are of advantage in the operating and control of processing equipment to produce improved rate of processing, consistency of product and quality of product.

It should be noted further with respect to the apparatus as shown in FIG. 2, the pressure of the tip 148 of the second surface 136 against the surface of the rotor 110 may be established by other means, such as, fixing the pivot 138 and making surface 136 of an elastic material, such as spring steel, adjusted in position to produce the desired pressure of tip 148 against rotor 110 or by replacing weight 146 by a spring attached to lever arm 144 at one end and at the other end attached to a base, fixed with respect to the case 112 and so adjusting the spring as to produce the desired pressure between tip 148 of the second surface 136 and the surface of the rotor 110.

Referring now to FIG. 3, the parts are numbered to correspond to the previous figures; rotor 210, case 212, axis of rotation 214, guide means 216, annular region 218, hopper 220 feed material 222, direction of rotor rotation 226, rolling bank of polymer melt 228, direction of rotation of rolling bank 230, first surface of hopper 232, third surface of hopper 234, second surface 236, pivot 238, directions of second surface's motion about pivot 240, 242, tip of second surface 248, heating and cooling ports 250, exiting volatiles 252.

In the embodiment of the invention as shown in FIG. 3, the annular region 218 is enlarged in the region of the rolling bank of polymer material to supply a greater volume of material for the guide means 216 to axially transport through the processing apparatus.

In addition, pressure sensing transducers, 264, 268, (such as those commonly used in the industry to determine die pressure in extruders) are located in the wall of the case 212 in the area of the rolling bank of polymer melt 228. These pressure sensing transducers 264, 268 are used to control the rate of introduction of new feed material 222 into the processing apparatus. As the pressure sensed by the transducers 264, 268 decreases when the rolling bank becomes smaller, a valve (not shown) is opened allowing hydraulic fluid under pressure to enter port 266 of a hydraulic cylinder 258 thereby pushing piston 260 towards the right. Piston 260 is connected through linkage 256 and pinion 254 to the second surface 236 of the hopper. As hydraulic fluid enters port 266 the second surface 236 pivots around pivot 238 in the direction of arrow 242 thereby moving the tip 248 of the second surface away from the surface of the rotor 210 and thereby providing a larger space between the tip 248 and the rotor 210 for new material to enter the rolling bank of polymer material 228.

Conversely as the pressure sensed by the transducers 264, 268 increases as the rolling bank 228 becomes large, a valve (not shown) is opened allowing hydraulic fluid under pressure to enter port 262 of a hydraulic cylinder 258 thereby pushing piston 260 towards the left and thereby through linkage and pivots 256, 254 and 238 causing the tip 248 of the second surface 236 to pivot in the direction 240 thereby reducing the space between the tip 248 and the rotor surface 210 thereby restricting the entrance of new feed material 222 into the rolling bank 228. In this manner, the amount of material in the rolling bank 228 may be controlled by using the second surface 236 as a control means.

It should be noted that the hydraulic system 258, 260 and linkage 256, 254 and 238 is not the only possible manner of activating the motion of the tip 248 of the second surface 236 with respect to the surface of the rotor 210. Any suitable kinemetic mechanical system available in the current art of pressure transducer activated mechanical motion may be used.

Referring now to FIG. 4 in which like numerals are used to indicate like parts, a method is presented of automatically controlling the introduction of charges or doses of new feed material into the hopper 320 and hence into the processing apparatus in response to the need of the apparatus for new feed material as determined by the size of the rolling bank 328.

It should be noted that in certain processing operations the objective is to mix and compound together various ingredients of the final product that may in the feed form have very different physical forms. An example is the compounding of rubber formulations for vehicle tires wherein the feed is composed of large pieces of rubber, such as bails or chunks of rubber, together with carbon black in fine particulate form and curing agents such as sulphur in powder form in combination with lubricants and other desired additives that may be fed to the processing equipment in liquid form.

If such a charge or dose were used as the feed material 22, 122, 222 of FIGS. 1, 2, 3, the liquid would enter the processing apparatus first and the smaller particulate material would enter the processing apparatus with the liquid or shortly thereafter leaving behind the larger particulate material such as the bails or chunks of rubber which would require a much larger opening between the tip of the second surface 148, 248 and rotor 110, 210 in order to pass into the processing apparatus and to join into the rolling bank 128, 228.

The embodiment of the present invention shown in FIG. 4 overcomes this problem by intermittently supplying a charge or dose of all the ingredients of the formulation to be processed in an automatic manner as from time to time the rolling bank 128, 228, 328 requires additional feed material.

Specifically the embodiment of the present invention as shown in FIG. 4 operates in the following manner. When the rolling bank of polymer melt material is becoming exhausted, its upper surface moves to a lower position in the radial gap 318 as shown by the position indicated by number 328 in FIG. 4. The second surface 336 of the hopper system is then free to move in the direction 342 about the pivot 370 due to the mass of the tray or charge basket 380 acting about the pivot 382 through lever arms 378 and 372. As a result, hinge means 374 moves away from latch surface 376 allowing the tray 380 to fall downward, pivoting about pivot 382 and to dump the charge onto the first surface 332 of the hopper 320. Because the second surface 336 is free to move in the direction 342 about pivot 370 the entire charge or dose is free to easily and concurrently move under the tip 348 due to the drag of the rotor 310 and to enter the rolling bank and to contribute to its size so that its upper surface rises to the position shown by 386.

When the rolling bank 386 is full, it pushes the tip of second surface 348 against the surface of the rotor 310 and holds it there under the rolling action as indicated by the arrow 388. At this point in time the charge tray or basket 380 may be repositioned to the configuration shown by the figure and a new charge or dose placed therein by any suitable means such as hand or weigh feeders as practiced in the current art of batch charging of processing equipment. When the rolling bank becomes exhausted again the surface moves to position shown by 328 and the process is repeated.

A further embodiment of the present invention uses the pressure sensing devices 264 and 268 to activate the dumping of charges or doses 384 into the hopper 120, 220, 320 without the need for the reaction of the second surface 136, 236 and 336, wherein upon the sensing by elements 264 and 268 of a need for more feed material in the rolling bank 128, 228 and 328 any conventional batch feeder is activated to dump a new charge of feed material into the rolling bank 138, 238 and 338.

A still further embodiment of the present invention provides a manner of improving the introduction of new feed material into the processing apparatus by means of a forced oscillation of the second surface 236 of FIG. 3 which oscillation about pivot 238 in directions 240 and 242 results in a motion of tip 248 away from and then toward the surface of the rotor 210. This oscillation can be achieved by alternately introducing hydraulic fluid under pressure into ports 264 and 262 of the hydraulic cylinder 258 by means of any conventional alternating valving system (not shown) or by any other mechanical means of causing an oscillation such as a cam activated vibrating apparatus. Such oscillation of tip 248 alternately pushes new feed material against the surface of rotor 210 thereby increasing the frictional drag of the feed material against the rotor to increase the drag transport of feed material into the apparatus and then alternately increasing the flow of new material 222 from the hopper 220 by moving the second surface 236 in the direction 242 to supply new feed material to be pressed against the rotor surface 210 upon the reverse oscillation, in the direction 240, to again increase the rotor drag transport upon the reverse cycle of the tip, 248.

It can thus be seen that an apparatus and method have been herein described that improves the introduction of new feed material to processing equipment by means of a second surface 136, 236 and 336 inside the feed hopper which encourages the feed material to enter the processing equipment by pushing it against the surface of the rotor to improve the drag of the rotor on the new feed material thereby enhancing the entrance of the feed material into the processing apparatus. In addition, a method and apparatus has herein been presented that permits the control of the entrance of new feed material into the processing equipment by means of a second surface 136, 236 and 336 within the feed hopper which acts as a gate controlling the entrance of feed material in response to pressure sensoring elements which control the position of the second element and in addition a method and apparatus is herein presented whereby said second surface acts as an activating element controlling the introduction of charges or batches of new feed material in response to the need of the processing apparatus for the introduction of said feed.

It can therefore be seen that an improved method and apparatus are herein provided which is uncomplicated, and provides ease of manufacture, maintenance and operation. Apparatus according to the present invention obviates the problem of bridging of feed material in the hopper or reservoir of processing equipment and obviates the problem of melted material clogging the exit of the hopper (thereby reducing the inflow of new feed material) and in addition the method and apparatus herein described provides a system of feed processing equipment that controls the introduction of new material to the processing equipment when needed by the equipment to produce a continuous supply of output product therefrom.

It should now be appreciated that the method and apparatus described herein include a control means which is extremely simple in construction and yet provides a multitude of functions including limiting the effective area of the inlet opening for the introduction of new material, urging the material that is to be introduced into contact with the rotor to increase the drag thereon, providing a wall surface of the inlet hopper, providing a portion of the outlet for venting undesirable gases and controlling the amount of new material introduced in response to the amount of hot melted material.

While what has been described herein are the preferred embodiments of the present invention, it is of course to be understood that various modifications and changes may be made therein without departing from the invention. Accordingly, it is intended to cover in the following claims all such modifications and changes as may fall within the true spirit and scope of the present invention.

I claim:

1. A hopper apparatus with an improved feed system for polymer processing comprising:
   a. a casing having a generally cylindrical inner surface;
   b. a rotatably mounted rotor having generally cylindrical surface concentric with said inner surface of said casing and spaced inward therefrom to define an annular region therebetween;
   c. a hopper having a downwardly facing discharge opening communicating with said annular region; and
   d. a control means movably attached to said casing and positioned extending into said annular region adjacent said rotor for varying the effective area of said discharge opening, said control means being actuated by material located in said annular region.

2. The apparatus as defined in claim 1 wherein said control means is movable toward said rotor to increase the drag imposed on new material by said rotor.

3. The apparatus as defined in claim 1 wherein said control means defines at least a portion of a vent outlet for removing gases from said annular region.

4. The apparatus as defined in claim 1 wherein said inner casing surface includes an enlarged portion which increases the size of said annular region adjacent said control means.

5. The apparatus as defined in claim 1 including a guide means extending downward from said hopper and abutting said rotor.

6. The apparatus as defined in claim 1 wherein said control means is a surface movable to abut said rotor.

7. The apparatus as defined in claim 6 wherein said control means includes a tip thereon extending the tangential area of abutment between said control means and said rotor.

8. The apparatus as defined in claim 1 wherein said control means further comprises:
   a. an axis with the upper end of said control means pivotally mounted thereon; and
   b. a counterbiased shaft pivotally mounted to said axis and fixedly mounted to bias said control means into abuttment with said rotor.

9. The apparatus as defined in claim 1 wherein said control means comprises:
   a. means for sensing the amount of hot melted material; and
   b. piston and cylinder means activated by said sensing means to vary the bias of said control means against said rotor.

10. The apparatus as defined in claim 1 wherein said control means comprises:
    a. a tip extending said control means tangentially along the surface of said rotor, said tip extending into the hot melted material when the material is in a fully supplied condition thereby urging said tip to abut said rotor to decrease the size of said discharge opening;
    b. a hinge means secured to said control means, said hinge means being releasable upon movement of said control means away from abutment with said rotor; and
    c. a charge tray attached to said hinge and adapted to release a charge of new polymer material into said hopper upon the release of said hinge.

11. A method for feeding polymeric material into processing and mixing equipment which comprises:
    a. introducing new polymeric material into a hopper;

b. controlling the amount of new material released into the hot melt material in response to the amount of hot melt material;
c. heating the melting material while in an annular region about a rotor; and
d. urging the released new material into contact with an essentially cylindrical rotating rotor to facilitate movement of new material into the previously melted hot material.

12. The method as defined in claim 11 further comprising venting the melted material to allow the removing of gases.

13. The method as defined in claim 12 wherein said venting is performed through a path entirely distinct from the hopper.

14. The method as defined in claim 11 wherein said controlling is responsive to the amount of hot melted material located within the hopper.

* * * * *